(12) United States Patent
Audouin et al.

(10) Patent No.: US 8,728,422 B2
(45) Date of Patent: May 20, 2014

(54) SYSTEM INTENDED TO REDUCE THE AMOUNT OF NOX IN THE EXHAUST GASES OF A MOTOR VEHICLE

(75) Inventors: Arnaud Audouin, Paris (FR); Jean-Baptiste Dementhon, Paris (FR)

(73) Assignee: Aaqius & Aaqius S.A., Geneva (CH)

( * ) Notice: Subject to any disclaimer, the term of this patent is extended or adjusted under 35 U.S.C. 154(b) by 0 days.

(21) Appl. No.: 13/825,001

(22) PCT Filed: Oct. 20, 2011

(86) PCT No.: PCT/IB2011/002522
§ 371 (c)(1),
(2), (4) Date: Jun. 5, 2013

(87) PCT Pub. No.: WO2012/056286
PCT Pub. Date: May 3, 2012

(65) Prior Publication Data
US 2013/0287656 A1    Oct. 31, 2013

(30) Foreign Application Priority Data
Oct. 25, 2010   (EP) ..................... 10013919

(51) Int. Cl.
B01D 53/94  (2006.01)
F01N 3/10   (2006.01)
F01N 3/18   (2006.01)
F01N 3/20   (2006.01)

(52) U.S. Cl.
USPC ........ 423/212; 423/213.2; 422/109; 422/169; 422/172; 422/173; 60/274; 60/284; 60/287; 60/292; 60/299; 60/300; 60/301; 60/320

(58) Field of Classification Search
USPC ............... 423/212, 213.2; 422/109, 169, 172, 422/173; 60/274, 284, 287, 292, 299, 300, 60/301, 320
See application file for complete search history.

(56) References Cited

U.S. PATENT DOCUMENTS

| 4,365,475 | A | * | 12/1982 | Dunlap ........................ 60/673 |
| 5,478,545 | A | * | 12/1995 | Bougard et al. ............. 423/308 |
| 8,088,201 | B2 | * | 1/2012 | Johannessen .................. 96/108 |
| 8,449,857 | B2 | * | 5/2013 | Johannessen et al. ........ 423/352 |
| 2003/0101714 | A1 | | 6/2003 | Huthwohl et al. |
| 2010/0047638 | A1 | * | 2/2010 | Johannessen .................. 429/17 |
| 2013/0213011 | A1 | * | 8/2013 | Audouin ...................... 60/274 |

FOREIGN PATENT DOCUMENTS

| EP | 0596854 | 10/1993 |
| WO | WO 2007/000170 | 1/2007 |

* cited by examiner

*Primary Examiner* — Timothy Vanoy
(74) *Attorney, Agent, or Firm* — Blakely Sokoloff Taylor & Zafman

(57) ABSTRACT

System to reduce the amount of NOx in exhaust gases of a vehicle. The system includes a storage space 1 containing an agent, a SCR catalytic converter 5, an injection module 6c to inject the agent upstream of the converter, a heat exchanger 2 containing a porous matrix, a shutter or injector 11 to control the flow rate of the agent to the exchanger, a valve 12 between the storage space and exchanger, to transfer thermal energy to gases during the starting period. The shutter or injector controls the flow of agent into the exchanger during the starting period to raise its temperature, and is closed when gases have reached a certain temperature. The valve regulates exchanger pressure during a period at operating temperature and conveys the agent to storage space when the exchanger pressure is higher than storage space pressure.

17 Claims, 4 Drawing Sheets

SYSTEM INTENDED TO REDUCE THE AMOUNT OF NOX IN THE EXHAUST GASES OF A MOTOR VEHICLE

The proposed invention relates to an SCR (Selective Catalytic Reduction) catalyst system intended to reduce the quantity of NOx in the exhaust gases of a motor vehicle.

Emissions of pollutants related to transport have for around thirty years been a prime dynamic of progress in industry. The fact that the emission limits for the four regulated pollutants (CO, HC, NOx, particulates) have progressively become more severe has significantly enabled improvement in air quality, in particular in large towns.

The ever increasing use of motor cars requires pursuing efforts for reducing these emissions of pollutants still further. Thus the reduction of nitrogen oxides (NOx) remains a complex problem in the context of the more severe European emission thresholds expected in 2015 with the coming into force of the 6 standard. Having available pollution control technologies that are highly effective under all running conditions remains a major challenge for the transport industry.

Secondly, the consumption of fuel, in direct relationship with $CO_2$ emissions, has become in few years the major concern for the car industry. Thus, regulations will be put in place at a European level as from 2012 on the $CO_2$ emissions of private cars. It is already established that this limit will be regularly lowered over the decades to come. $CO_2$ is therefore imposed as the new growth driver for the whole transport industry.

This double problem of reduction of local pollution (NOx) and reduction in fuel consumption (CO) is particularly difficult for the diesel engine, the combustion of which in a lean mixture is accompanied by a NOx emission that is difficult to deal with.

It is in this context that the SCR post-treatment technology is envisaged both for vehicles allocated to goods transport and private vehicles. It has in fact been demonstrated that the high efficiency of NOx reduction makes it possible to position the engine on its optimum functioning in terms of efficiency, the high NOx emissions then being treated at the exhaust by the SCR system.

One constraint of the SCR technology is the need to install on a vehicle a reducing agent necessary for the reduction of the nitrogen oxides. The system currently adopted for heavy goods vehicles uses urea in aqueous solution as the reducing agent. Injected in the exhaust, the urea decomposes into ammonia ($NH_3$) through the effect of the temperature of the exhaust gases and enables the NOx to be reduced on a specific catalyst.

The integration of a reservoir of urea in aqueous solution remains a high constraint for the SCR system. An alternative solution under study is the storage of gaseous ammonia in salts. In this case, the ammonia is stored in the form of a chemical complex in a porous matrix consisting in particular of salts of the chloride type ($MgCl_2$, $SrCl_2$, $CaCl_2$, $BaCl_2$, $ZnCl_2$, etc.). The ammonia is desorbed by modifying the temperature and/or pressure of the matrix and is then injected into the exhaust for treatment of the NOx.

The chemical reactions involved in the post-treatment of fumes coming from combustion within thermal engine are catalytic reactions that depend principally on the temperature of the exhaust gases and the catalytic impregnation.

However, when the vehicle is started up, the temperature of the exhaust gases is insufficient to provide significant catalytic conversion. It is therefore necessary to wait for a certain length of time for the exhaust gases to reach a temperature at which the reduction of the NOx by SCR is effective. FIG. 1 shows a typical change in exhaust temperature over a Europe approval cycle (New European Driving Cycle: NEDC). The NOx emissions obtained after post-treatment by the SCR catalyst and the efficiency of this post-treatment are also indicated. Thus, when the vehicle starts, the temperature in the exhaust is insufficient to ensure significant catalytic conversion, the emissions issuing from the engine are therefore not post-treated, and efficiency is close to zero. The temperature progressively increases during the cycle and then enables "ignition" of the post-treatment system, and catalytic conversion is possible with an efficiency that may approach 100%.

The aim of the present invention is therefore to provide a system intended to reduce the quantity of NOx in the exhaust gases of a motor vehicle and arranged to accelerate the temperature rise of the exhaust gases when the motor vehicle starts in order to shorten the time necessary for the catalytic conversion to be optimum.

In accordance with the invention, this aim is achieved by virtue of an SCR catalyst system intended to reduce the quantity of NOx in the exhaust gases of a motor vehicle, the system comprising: a storage chamber containing a reducing agent; an SCR catalyst for treating the exhaust gases loaded with reducing agent, and an injection module arranged to inject the reducing agent coming from the storage chamber into the exhaust gases of the motor vehicle, upstream of the SCR catalyst. The system according to the invention also comprises: at least one heat exchanger connected to the storage chamber and containing a porous matrix intended to absorb the reducing agent coming from the storage chamber; a shutter or injector downstream of the storage chamber and upstream of the exchanger and arranged to control the addition of reducing agent in the exchanger, and a valve placed between the storage chamber and the exchanger. The exchanger is arranged to transfer thermal energy to the exhaust gases of the motor vehicle upstream of the SCR catalyst during a first so-called starting period following the starting of said vehicle. The shutter or injector is arranged to control the flow rate of the reducing agent in the exchanger during said starting period so that the absorption of reducing agent by the porous matrix of the exchanger raises the temperature of the latter. The shutter or injector is also arranged then to be closed during a so-called operating-temperature period during the functioning of the motor vehicle as soon as the exhaust gases have reached a certain temperature. The valve for its part is arranged so as firstly to regulate the pressure inside the exchanger during said operating-temperature period and secondly to convey the reducing agent contained in the exchanger into the storage chamber when the pressure inside the exchanger is greater than the pressure inside the storage chamber.

In a preferential embodiment of the invention, the storage chamber contains a first salt while the exchanger contains a second salt. The salts are metal chlorides chosen so that the ammonia desorption enthalpy of the first salt arranged in the storage chamber is less than the ammonia desorption enthalpy of the second salt arranged in the exchanger.

In another embodiment of the invention, the storage chamber comprises pressurised ammonia as reducing agent instead of the first salt.

The invention also relates to a method for implementing the SCR catalyst system comprising the following steps:
    opening the valve when the motor vehicle starts so that the reducing agent contained in the storage chamber is conveyed in gaseous form in the exchanger under the effect of the difference in pressure existing in respectively the storage chamber and the exchanger;

closing the valve when the temperature of the gases has reached a predetermined value;

progressively draining the exchanger during the operating period of the motor vehicle, by discharging the reducing agent through the valve so that it is once again introduced into the storage chamber.

The features of the invention will become more apparent from a reading of the description of several embodiments, given solely by way of examples, in no way limitatively, referring to the schematic figures, in which.

DETAILED DESCRIPTION OF THE INVENTION

In the system proposed, the storage of the reducing agent is based on a reversible solid-gas reaction of the type:

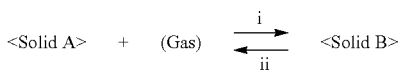

in which the gas is ammonia and the solid an anhydrous salt of the metal chloride type: $MgCl_2$, $SrCl_2$, $CaCl_2$, $BaCl_2$, $ZnCl_2$, etc.

The absorption (i) and desorption (ii) reactions are entirely reversible. The ammonia equilibrium pressure of the system can be determined for a given temperature by the Clausius-Capeyron equation that is given by the following formula:

$$\ln P_{NH3} = \frac{-\Delta Hr}{RT} + \frac{\Delta Sr}{R}$$

where $\Delta Hr$ is the desorption enthalpy per mol of $NH_3$, $\Delta Sr$ is the desorption entropy per mol of $NH_3$ and R the perfect gases constant.

According to this formula, the ammonia equilibrium pressure of these salts depends on temperature.

Figure 1:
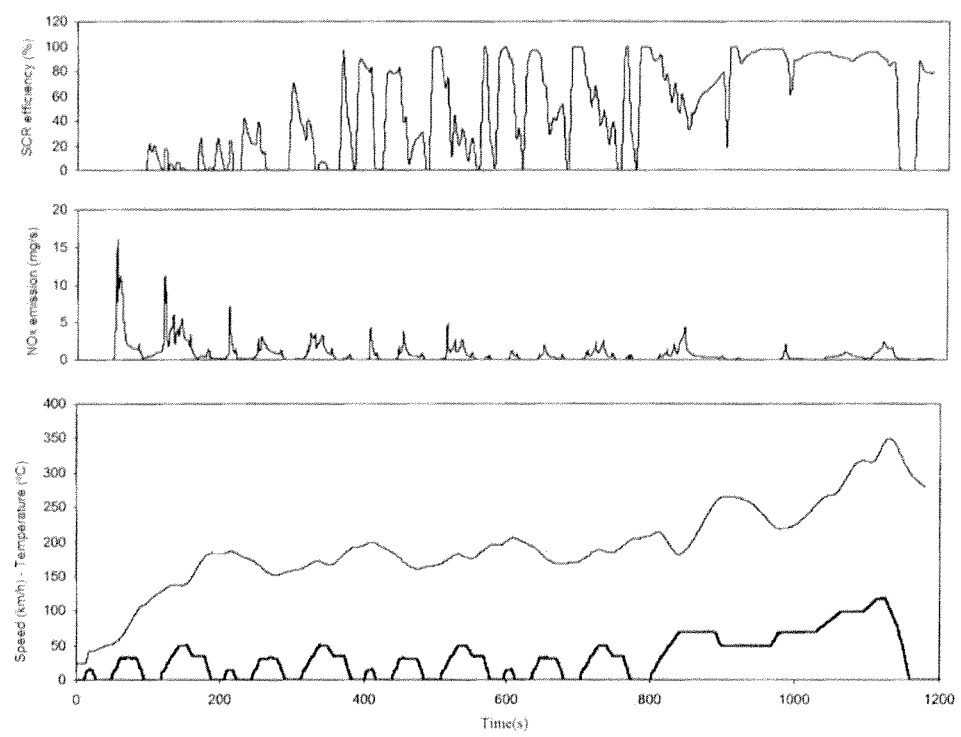
FIG. 1 illustrates the efficiency of the catalytic conversion, the NOx emissions and the temperature of the exhaust gases according to an NEDC (New European Driving Cycle) approval cycle for a conventional depollution system.
Figure 2:
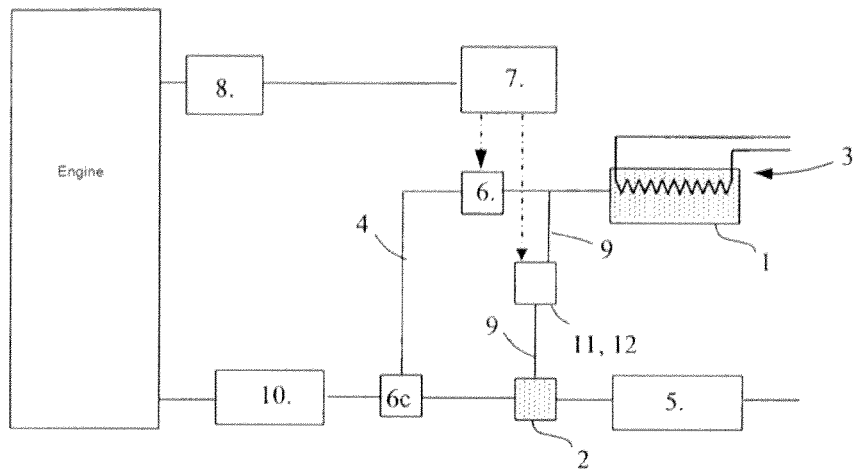
FIG. 2 illustrates an SCR catalyst system intended to reduce the quantity of NOx in the exhaust gases according to a first embodiment of the invention.

According to the first embodiment of the invention as illustrated by FIG. 2, the system comprises two composite materials arranged respectively in the storage chamber 1 and in the exchanger 2. Each composite material comprises one or more compressed salts and preferably expanded graphite, which is used as a binder so as to obtain a porous matrix intended to receive ammonia. The salt of the composite material arranged in the storage chamber 1 (hereinafter referred to as Salt A) and the salt of the composite material arranged in the exchanger 2 (hereinafter called Salt B) are chosen so that the ammonia desorption enthalpy of Salt A is less than the ammonia desorption enthalpy of Salt B. Salt A is preferably barium chloride ($BaCl_2$) or strontium chloride ($SrCl_2$) while Salt B is preferably manganese chloride ($MnCl_2$), ferrous chloride ($FeCl_2$) or magnesium chloride ($MgCl_2$).

With reference to FIG. 2, the storage chamber 1, containing Salt A intended to absorb and desorb ammonia, is arranged to be temperature-controlled by a heating body 3 in order to desorb the ammonia from Salt A and convey it through a first pipe 4 in order to be able to inject it into the exhaust gases upstream of an SCR catalyst 5. To limit the consumption of energy of the heating body 3, the pressure inside the chamber 1 must be limited to a low value while being sufficiently high to allow a sufficient flow of ammonia compatible with the NOx emissions of the thermal engine. To this end, the storage chamber 1 is connected to a supply module 6 that is controlled by a dedicated computer 7 connected to the engine computer 8. According to FIG. 4, this supply module 6 comprises a device 6a for measuring the pressure or temperature in the storage chamber 1 as well as an ammonia metering device 6b. The pressure or temperature measured by the pressure or temperature measuring device 6a in the chamber 1 is compared with a set pressure or temperature. The latter is determined dynamically according to an analysis of a certain number of engine and vehicle parameters, such as for example the concentration of NOx emitted at each instant (a quantity that can be measured and/or modelled), the temperature of the engine lubricant, the temperature of the engine cooling liquid, the temperature at the exhaust in the gas stream or in the catalyst or filter channels, the speed of the vehicle, the engine speed, the engine load or a combination of these parameters.

Still according to FIG. 2, the heat exchanger 2, connected to the storage chamber 1 by a pipe 9, is arranged in the exhaust gas flow downstream of one or more additional cleanup elements 10 in the form of an oxidation catalyst or a three-way catalyst and, where applicable, a particulate filter, the heat exchanger 2 also being arranged downstream of an ammonia injection module 6c and upstream of the SCR catalyst 5.

Figure 4:
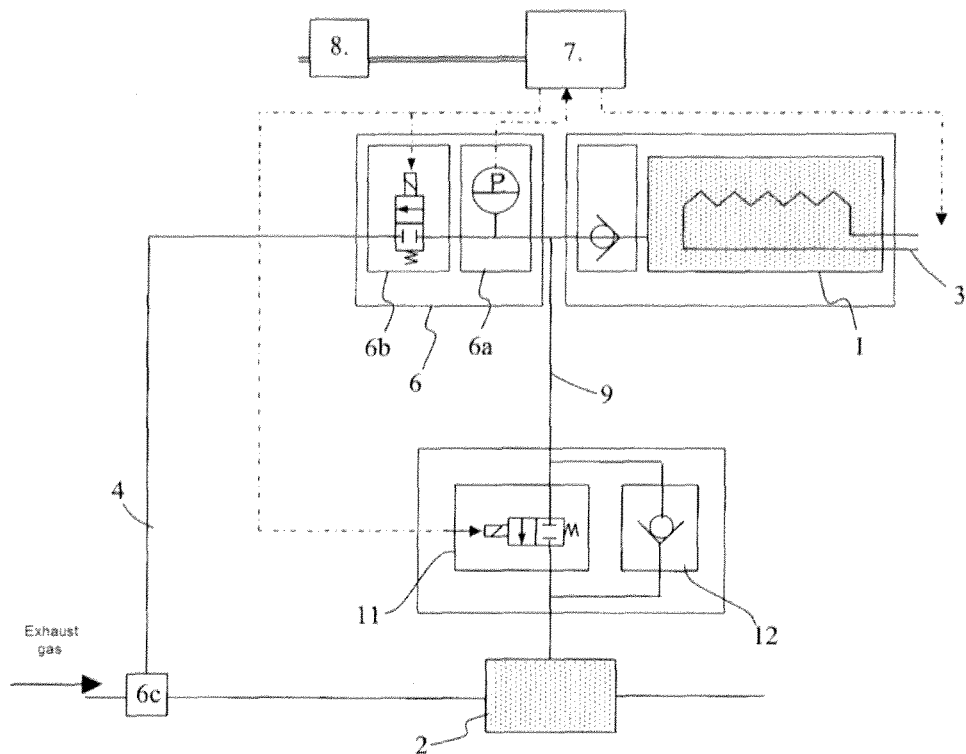
FIG. 4 shows a more detailed part of the system according to the first and second embodiments of the invention.
Figure 5:
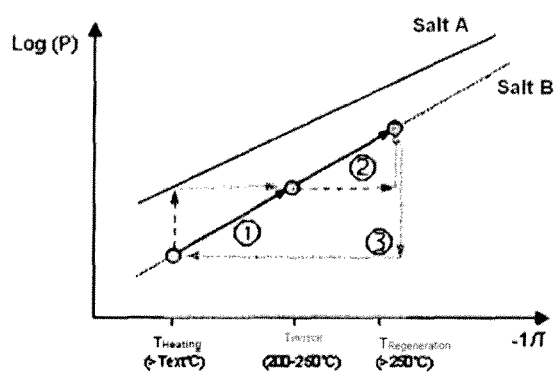
FIG. 5 shows the operating principle of the system according to the Clapeyron equation.

According to FIG. 4, a valve 11 is mounted on the pipe 9 downstream of the storage chamber 1 and upstream of the exchanger 2, and is arranged so as to be controlled by the computer 7 so as to control the addition of ammonia in said exchanger 2. The SCR catalyst system according to the invention also comprises a valve 12 placed between the storage chamber 1 and the exchanger 2.

Figure 6:
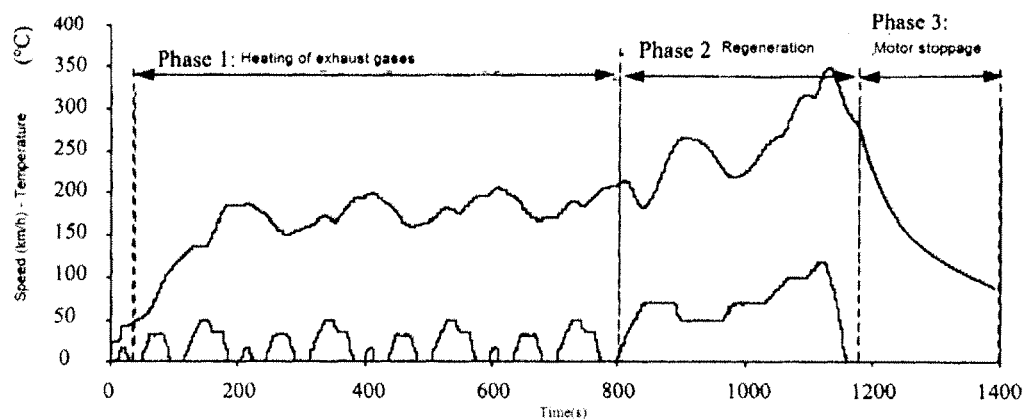
FIG. 6 shows the functioning of the heat exchanger in the exhaust line according to the NEDC approval cycle.

The functioning of the SCR catalyst system according to the invention can be divided into two phases (FIG. 6), namely a first starting phase beginning with the starting of the motor vehicle and continuing until the exhaust gases have reached a temperature at which the catalytic conversion is optimum (hereinafter referred to as the starting period) followed by a second operating phase of the motor vehicle continuing until the stopping of the engine (hereinafter referred to as the operating period).

When the motor vehicle starts, the exhaust gases are relatively cold. Under these circumstances, the temperature in the storage chamber 1 is similar to that in the exchanger 2. Because of the different natures of the salts A and B, the pressure inside the storage chamber 1 is greater than the pressure inside the exchanger 2. During the starting period, the shutter 11 is open so that ammonia in gas form is conveyed from the chamber 1 through the pipe 9 in order to be injected to in the exchanger 2 and absorbed by the Salt B. This absorption causes an increase in the temperature of the exchanger 2 in accordance with the Clausius-Capeyron equation, enabling the exhaust gases to be heated by conduction of heat.

As soon as the exhaust gases have reached a temperature at which the catalytic conversion is optimum, the valve 11 closes. The temperature of the exhaust gases is then around 250° C. or even more, which raises the temperature of the exchanger 2, which increases the pressure inside the latter. The valve 12 is arranged firstly to regulate the pressure in the exchanger 2 during the period at operating temperature and secondly to redirect the ammonia from the exchanger 2 into the storage chamber 1. Thus, under the effect of the temperature of the exhaust gases discharged during the operating period of the motor vehicle, the exchanger 2 is progressively "emptied" of ammonia. During the operating temperature period of the motor vehicle, the system according to the invention functions in a completely passive way.

When the engine stops, the system returns gradually to the outside temperature. Under these circumstances, the pressure in the storage chamber 1 is once again greater than the pressure in the exchanger 2. The shutter 11 is held in the closed position in order to confine the ammonia gas in the storage chamber 1. The system is regenerated, ready to function when the motor vehicle next starts up.

Figure 3:
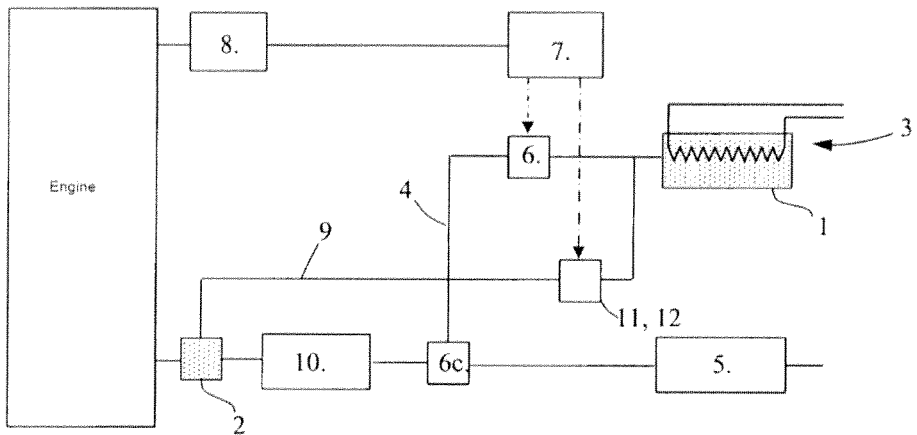
FIG. 3 illustrates an SCR catalyst system intended to reduce the quantity of NOx in the exhaust gases according to a second embodiment of the invention.

In a second embodiment as illustrated by FIG. 3, the additional cleanup element or elements (11) are arranged upstream of the ammonia injection module 6c, whereas the SCR catalyst 3 for its part is arranged downstream of the injection module.

In a second application of the present invention, the metering device makes it possible to control the flow of ammonia gas flowing to the exchanger 2 according to the pressure measured in particular inside the storage chamber 1. This device of the injector type then makes it possible to adjust the pressure rise profile in the exchanger 2 and thus the heating capacity transmitted to the exhaust gases.

According to a variant embodiment, the storage chamber 1 contains pressurised ammonia, instead of the Salt A, whereas the exchanger 2 for its part contains a salt of the metal chloride type such as barium chloride ($BaCl_2$) or strontium chloride ($SrCl_2$).

In the present invention, the start and end of the exhaust gas heating phase and the opening profile of the metering device during this phase are controlled by a computer 7 according to a certain number of engine parameters. The temperature of the engine cooling water, the oil temperature, the temperature of the exhaust gases and/or an analysis of the past and present running conditions can in particular be taken into account. Through the calibration of this control strategy, it is necessary to ensure that the regeneration phase is sufficiently long and at a sufficiently high temperature for the heating device to be fully regenerated before the engine stops.

The principle described above provides a clever transfer of ammonia between the storage chamber 1, which is intended to supply firstly an injection system arranged in the exhaust line upstream of the SCR catalyst 5, and secondly the exchanger 2, making it possible to use the air-conditioning properties attached to the chemisorption of the $NH_3$ in a metal chloride allowing a regulation of the exhaust temperature.

Figure 7:
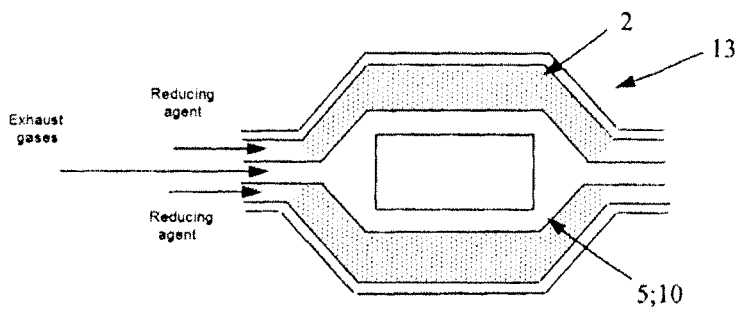
FIG. 7 illustrates a schematic view of a cleanup element with the exchanger arranged according to a first variant.
Figure 8:
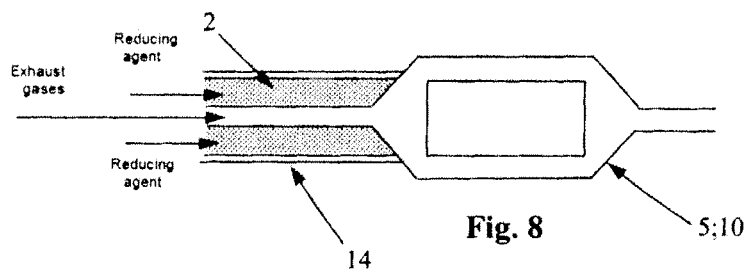
FIG. 8 illustrates a schematic view of a cleanup element with the exchanger arranged according to a second variant.
Figure 9:
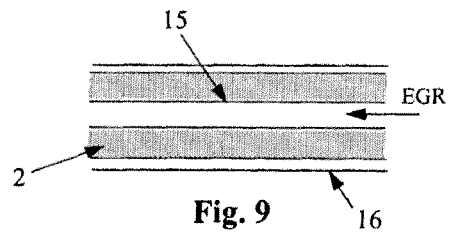
FIG. 9 illustrates a schematic view of a gas recirculation pipe around which the exchanger is arranged.

The exchanger 2 according to the invention is preferably arranged as close as possible to the exhaust line. According to FIG. 7, the porous matrix of the exchanger 2 is arranged around the SCR catalyst 5 or any other cleanup element 10, the cleanup element 5, 10 and the porous matrix of the exchanger 2 being confined inside a receptacle 13. In another configuration as illustrated by FIG. 8, a tube 14 is arranged coaxially around the exhaust line 14' at different points, the porous matrix of the exchanger 2 being arranged in the space between the exhaust line 1' and the tube 14.

The porous matrix of the exchanger 2 can also be arranged inside the catalyst 5 around the various catalytic slabs, this arrangement further having the advantage of thermally insulating the exhaust portions, including during the phases without ammonia transfer, that is to say confining a maximum amount of heat inside the exhaust and thus minimising the unnecessary energy losses to the outside.

There exist several exhaust line architectures potentially encountered on diesel engines, in particular:

an architecture comprising, following an exhaust gas recirculation circuit (hereinafter "EGR pipe")-a turbine-an oxidation catalyst (Diesel Oxidation Catalyst hereinafter "DOC"-a particulate filter (Diesel Particulate Filter hereinafter "DPF")-$NH_3$ injection and an SCR catalyst.

an architecture comprising, following an EGR pipe-a turbine-a DOC-$NH_3$ injection-an SCR catalyst-a DPF, an architecture comprising, following an EGR pipe-a turbine-a DOT-$NH_3$ injection an SCR catalyst and a DPF on a single substrate.

The aforementioned three architectures may also comprise a second LP EGR pipe connection referred to as low pressure (LP "Low Pressure" EGR in contradistinction to HP "High Pressure" EGR present on all diesels), situated downstream of the DPF.

The exchanger 2 according to the invention can therefore be arranged at different points according to the architecture and aim sought. It could for example be arranged at any point upstream of the turbine in order to accelerate the activation of the latter, with a view to limiting "turbo lag" and thus increasing torque at low engine speed. The reverse circulation (which makes it possible to "empty" the exchanger 2), can be involved to extract the heat from the exhaust line when the temperature exceeds the maximum temperature tolerated by the turbine.

The exchanger 2 can also be arranged at any point upstream of the oxidation catalyst (DOC) in order to accelerate the priming of the SCR catalyst situated always downstream of the DOC. This location can also have an impact for accelerating the activation of the catalyst with a view to regenerating the particulate filter. The storage capacity must fill during the phase where it is wished to recover heat.

The exchanger 2 can also be arranged downstream of the particulate filter in order to avoid overheating relating to the regeneration of the particulate filter and thus protect the SCR catalyst 5 from exotherms when it is situated downstream from the filter. In this case, the storage chamber 1 must be emptied when it is wished to prevent overheating.

The exchanger may also be arranged around the DPF substrate when the SCR catalytic impregnation is situated at the filter in order to avoid exotherms in the filtering material.

Finally, the exchanger may be arranged around the EGR pipes (HP and BP) in order to promote the cooling of the EGR flows with a view to increasing the flow rates thereof. In this case, the storage chamber must be emptied when it is wished to cool the EGR.

The invention claimed is:

1. System intended to reduce the quantity of NOx in the exhaust gases of a motor vehicle, the system comprising:
    a storage chamber containing a reducing agent;
    an SCR (Selective Catalytic Reduction) catalyst for treating the exhaust gases loaded with reducing agent, and
    an injection module arranged to inject the reducing agent coming from the storage chamber into the exhaust gases of the motor vehicle, upstream of the SCR catalyst, wherein said system also comprises:
- at least one heat exchanger connected to the storage chamber and containing a porous matrix intended to absorb the reducing agent coming from the storage chamber;
- a shutter or injector downstream of the storage chamber and upstream of the exchanger and arranged to control the addition of reducing agent in the exchanger, and
- a valve placed between the storage chamber and the exchanger;

and wherein
- the exchanger is arranged to transfer thermal energy to the exhaust gases of the motor vehicle upstream of the SCR catalyst during a first so-called starting period following the starting of said vehicle;
- the shutter or injector is arranged to control the flow rate of reducing agent in the exchanger during said starting period so that the absorption of the reducing agent by the porous matrix of the exchanger raises the temperature of the latter;
- the shutter or injector is arranged then to be closed during a so-called operating-temperature period during the functioning of the motor vehicle as soon as the exhaust gases have reached a certain temperature; and
- the valve is arranged so as firstly to regulate the pressure in the exchanger during said operating-temperature period and secondly to convey the reducing agent contained in the exchanger into the storage chamber when the pressure in the exchanger is greater than the pressure in the storage chamber.

2. System according to claim 1, wherein the shutter or injector is arranged to be closed right from the start of the operating-temperature period of the motor vehicle until the beginning of the next starting period.

3. System according to claim 1, wherein it also comprises a heating body arranged to heat the storage chamber according to the value of one or more parameters chosen from the concentration of emitted NOx, the temperature of the engine lubricant, the temperature of the engine cooling liquid, the speed of the vehicle, the engine speed and the engine load.

4. System according to claim 1, wherein the reducing agent is ammonia.

5. System according to claim 4, wherein the storage chamber contains pressurised ammonia and in that the porous matrix of the exchanger is a salt chosen from metal chlorides such as barium chloride, strontium chloride, magnesium chloride, calcium chloride and nickel chloride.

6. System according to claim 4, wherein the storage chamber and the exchanger contain respectively first and second salts, the salts being metal chlorides chosen so that the ammonia desorption enthalpy of the first salt is less than the ammonia desorption enthalpy of the second salt.

7. System according to claim 1, wherein the exchanger is arranged in the exhaust gases downstream of a module for injecting the reducing agent and upstream of the SCR catalyst.

8. System according to claim 1, wherein it also comprises one or more additional cleanup elements chosen from an oxidation catalyst, a three-way catalyst and a particulate filter, the cleanup element or elements being arranged upstream from the module for injecting the reducing agent whereas the SCR catalyst is arranged downstream of said injection module, and in that the exchanger is arranged upstream of said additional cleanup element or elements.

9. System according to claim 8, wherein the porous matrix of the exchanger or exchangers is or are disposed inside a tube around the exhaust pipe upstream of the SCR catalyst and/or upstream of said additional cleanup element or elements.

10. System according to claim 8, wherein the porous matrix of the exchanger or exchangers is or are disposed around the SCR catalyst and/or around said additional cleanup element or elements.

11. System according to claim 1, wherein it also comprises a pipe for recirculating the exhaust gases (hereinafter referred to as EGR), a tube mounted around the EGR pipe, the difference in diameter between the tube and the EGR pipe creating a volume inside which the porous matrix of the exchanger is arranged so as to be able to cool the EGR gases by conveying the reducing agent from the storage chamber to the exchanger when the temperature of the gases circulating in said EGR pipe exceeds a critical threshold.

12. Motor vehicle comprising the system according to claim 1, wherein the vehicle comprises a turbocompressor the turbine of which is arranged downstream of the exchanger.

13. Method of implementation of the system according to claim 1, comprising the following steps:
- opening the shutter or injector when the motor vehicle is started so that the reducing agent contained in the storage chamber is conveyed in gaseous form into the exchanger under the effect of the pressure difference existing in respectively the storage chamber and the exchanger;
- closing the shutter or injector when the temperature of the gases has reached a predetermined value;
- progressively draining the exchanger during the operating-temperature period of the motor vehicle, by discharging the reducing agent through the valve so that it is once again introduced into the storage chamber.

14. Method according to claim 13, in which the exchanger is completely drained and does not contain any reducing agent at the time of starting of the motor vehicle.

15. Method according to claim 13, in which the opening the shutter or injector is controlled by a computer according to the value of one or more parameters chosen from the concentration of emitted NOx, the temperature of the engine lubricant, the temperature of the engine cooling liquid, the exhaust temperature in the gas stream or inside the catalyst channels or filters, the speed of the vehicle and the engine speed.

16. Method for using the system according to claim 8, in which the shutter or injector is open when the motor vehicle is started so that the reducing agent contained in the storage chamber is conveyed in gaseous form into the exchanger arranged upstream of the oxidation catalyst in order to promote the production of $NO_2$ by the latter so as to improve the activation of the SCR catalyst.

17. Method of implementation of the system according to claim 12, in which the shutter or injector is open when the motor vehicle is started so that the reducing agent contained in the storage chamber is conveyed in gaseous form into the exchanger in order to accelerate the actuation of the turbine, and in which the shutter or injector is closed when the temperature upstream of the turbine exceeds the normal operating temperature range of the turbine.

* * * * *